United States Patent
White et al.

(10) Patent No.: US 6,886,885 B2
(45) Date of Patent: May 3, 2005

(54) REAR AND SIDE PANEL ASSEMBLY FOR A VEHICLE AND A METHOD OF ASSEMBLING A VEHICLE

(75) Inventors: Tommy E. White, Rochester Hills, MI (US); Adrian B. Chernoff, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/611,375

(22) Filed: Jul. 1, 2003

(65) Prior Publication Data

US 2005/0001451 A1 Jan. 6, 2005

(51) Int. Cl.[7] .............................................. B62D 25/08
(52) U.S. Cl. ........................ 296/193.08; 296/187.11; 296/203.04
(58) Field of Search .......................... 296/181.2, 181.3, 296/187.11, 187.12, 193.01, 193.03, 193.04, 193.08, 203.04

(56) References Cited

U.S. PATENT DOCUMENTS

| | | | | |
|---|---|---|---|---|
| 1,854,714 A | * | 4/1932 | Northup ................ | 296/193.08 |
| 2,233,316 A | * | 2/1941 | Klavik .................. | 296/203.04 |
| 2,569,218 A | * | 9/1951 | Bailey, Jr. .............. | 180/69.21 |
| 2,606,625 A | | 8/1952 | Paton .................... | 180/69 |
| 4,234,225 A | * | 11/1980 | Harasaki et al. ....... | 296/203.04 |
| 5,666,727 A | * | 9/1997 | Rashid .................. | 29/897.2 |
| 5,934,745 A | * | 8/1999 | Moore et al. .......... | 296/193.04 |
| 5,974,847 A | | 11/1999 | Saunders et al. ....... | 72/57 |
| 6,102,470 A | * | 8/2000 | Heim et al. ........... | 296/187.11 |
| 6,206,458 B1 | * | 3/2001 | Schroeder et al. ..... | 296/203.01 |
| 6,253,588 B1 | | 7/2001 | Rashid et al. ......... | 72/57 |
| 6,276,477 B1 | * | 8/2001 | Ida ....................... | 180/89.1 |

* cited by examiner

*Primary Examiner*—Patricia L. Engle
(74) *Attorney, Agent, or Firm*—Kathryn A. Marra

(57) ABSTRACT

A rear and side panel assembly for a vehicle body may include a one-piece inner body panel member mated with a one-piece outer body panel member, the body panels cooperating to at least partially define wheel well openings at opposing sides of the vehicle. The inner body panel member may include an inner rear panel portion with opposite ends, a first inner side panel portion at one end and a second inner side panel portion at the opposed end, with the inner side panel portions extending generally frontward from the inner rear panel portion. The outer body panel member may include an outer rear panel portion with opposite ends, a first outer side panel portion at one end and a second outer side panel portion at the opposed end, with the outer side panel portions extending generally frontward from the outer rear panel portion. A method of assembling a vehicle including the rear and side panel assembly described above may include forming the inner body panel member and forming the outer body panel member by quick plastic forming, super plastic forming or hydroforming. The method may further include bending the inner and outer body panel members, and mounting the inner and outer body panels to each other such that the outer body panel member substantially covers the outer face of the inner body panel member.

18 Claims, 2 Drawing Sheets

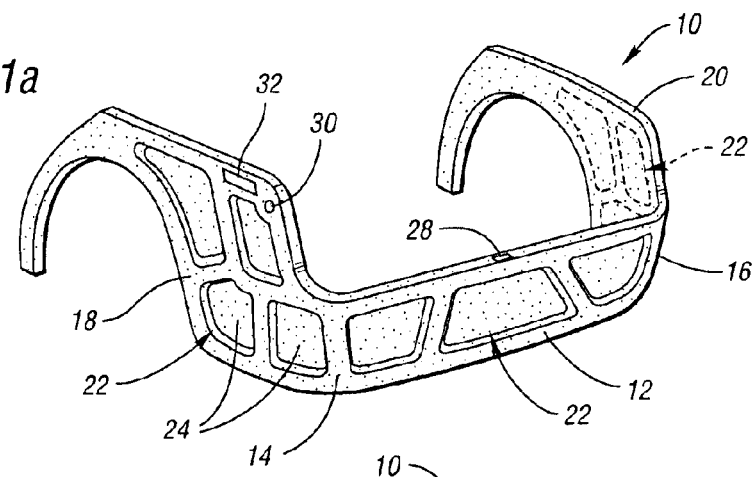
Fig. 1a
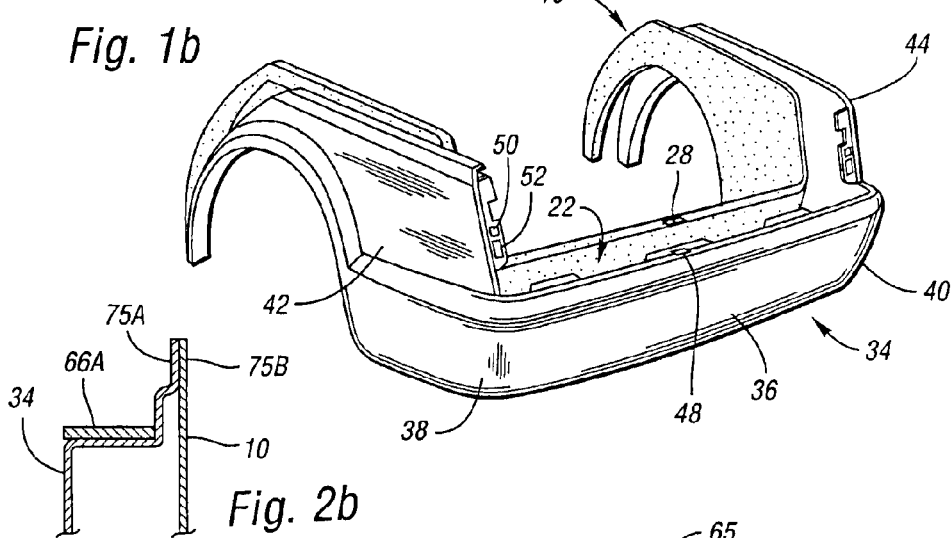
Fig. 1b
Fig. 2b
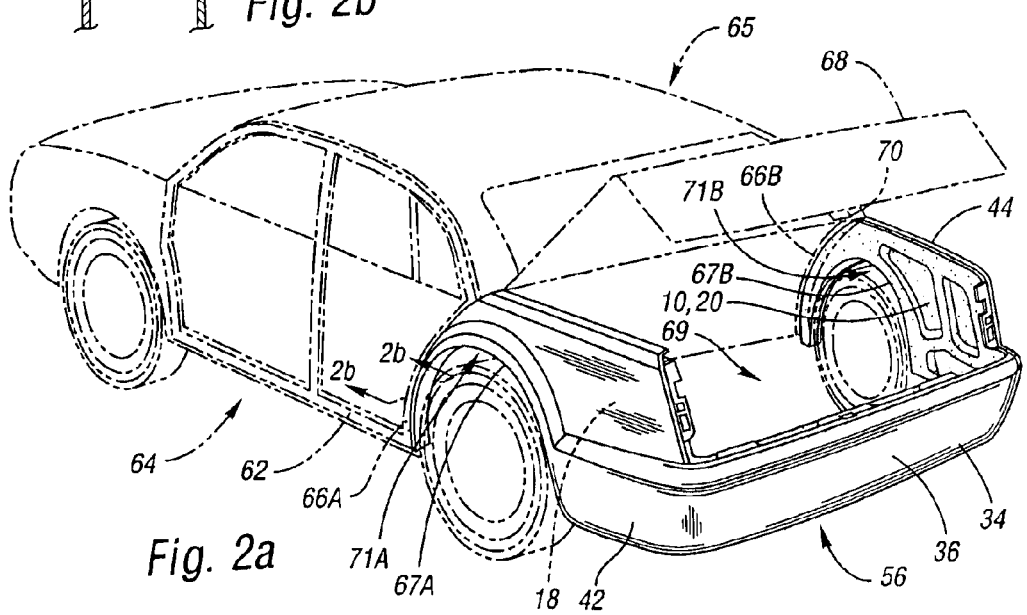
Fig. 2a

REAR AND SIDE PANEL ASSEMBLY FOR A VEHICLE AND A METHOD OF ASSEMBLING A VEHICLE

TECHNICAL FIELD

The invention relates to a rear and side panel assembly for a vehicle.

BACKGROUND OF THE INVENTION

A vehicle body is designed to withstand a variety of loads and stresses. The rear body portion of a vehicle typically includes rear body panels and quarter panels. A vehicle rear body panel typically includes an outer bumper portion and inner reinforcements. A rear panel, separate from the bumper, may also be positioned between the bumper and the trunk lid. The bumper portion, inner reinforcements, and rear panel typically are mounted at either end to rear end reinforcements provided on the vehicle for this purpose. A vehicle typically includes a right and a left quarter panel, each of which may require inner quarter panel reinforcements. Thus, the structural integrity of the rear portion of a vehicle is typically achieved by using several separate components.

SUMMARY OF THE INVENTION

A rear and side panel assembly for a vehicle body may include a one-piece inner body panel member mated with a one-piece outer body panel member, the members cooperating to at least partially defining wheel well openings for opposing sides of the vehicle. The inner body panel may include an inner rear panel portion with opposite ends, a first inner side panel portion at one end and a second inner side panel portion at the opposed end, with the inner side panel portions extending generally frontward from the inner rear panel portion. The outer body panel member may include an outer rear panel portion with opposite ends, a first outer side panel portion at one end and a second outer side panel portion at the opposed end, with the outer side panel portions extending generally frontward from the outer rear panel portion. The inner and the outer body panel members may be joined as an assembly. Preferably, the inner body panel member and the outer body panel member are each formed from a separate single rigid sheet of aluminum. The rear and side panel assembly may allow a reduction in the number of components necessary to provide a functional and structurally viable rear body portion, which is desirable for potentially decreasing the overall cost and increasing efficiency of vehicle assembly. This may be especially beneficial in the ability to produce low cost automobiles that meet the needs of developing world markets.

In one aspect of the invention, the inner body panel member has an outer face and the inner body panel member and the outer body panel member are sufficiently contiguous and coextensive with each other such that the outer body panel member substantially covers the outer face of the inner body panel member.

In another aspect of the invention, each of the side panel portions on the joined inner and outer body panel members define an edge that is configured to complement and further define a wheel well opening on a vehicle and each of the side panel portions is configured to extend frontward such that it is mountable to a body lock pillar on the vehicle.

In yet another aspect of the invention, a method of assembling a vehicle may include forming the inner body panel member. The method may further include forming the outer body panel member. Such forming may be by a method selected from the group consisting of quick plastic forming, super plastic forming and hydroforming. The method may also include mounting the outer body panel member and the inner body panel member to each other such that the members at least partially define wheel well openings at opposing sides of the vehicle The method may further include bending the inner body panel member such that the inner side panel portions extend generally forward from the inner rear panel portion. The method may also include bending the outer body panel member such that the outer side panel portions extend generally forward from the outer rear panel portion.

The above objects, features and advantages, and other objects, features and advantages of the present invention are readily apparent from the following detailed description of the best mode for carrying out the invention when taken in connection with the accompanying drawings.

BRIEF DESCRIPTION OF THE DRAWINGS

FIG. 1a is a schematic illustration in perspective view of an inner body panel member, including an inner rear panel portion and inner side panel portions, in accordance with the invention;

FIG. 1b is a partially exploded schematic illustration in perspective view of an outer body panel member, including an outer rear panel portion and outer side panel portions, being mounted to the inner member of FIG. 1a in accordance with the invention;

FIG. 2a is a schematic illustration in perspective view of a rear and side panel assembly, including the inner body panel member of FIG. 1a and the outer body panel member of FIG. 1b, mounted to a vehicle;

FIG. 2b is a horizontal cross-sectional view of the rear and side panel assembly connected to a chassis frame on the vehicle taken along the line 2b—2b in FIG. 2a.

DESCRIPTION OF THE PREFERRED EMBODIMENT

Figure 3:
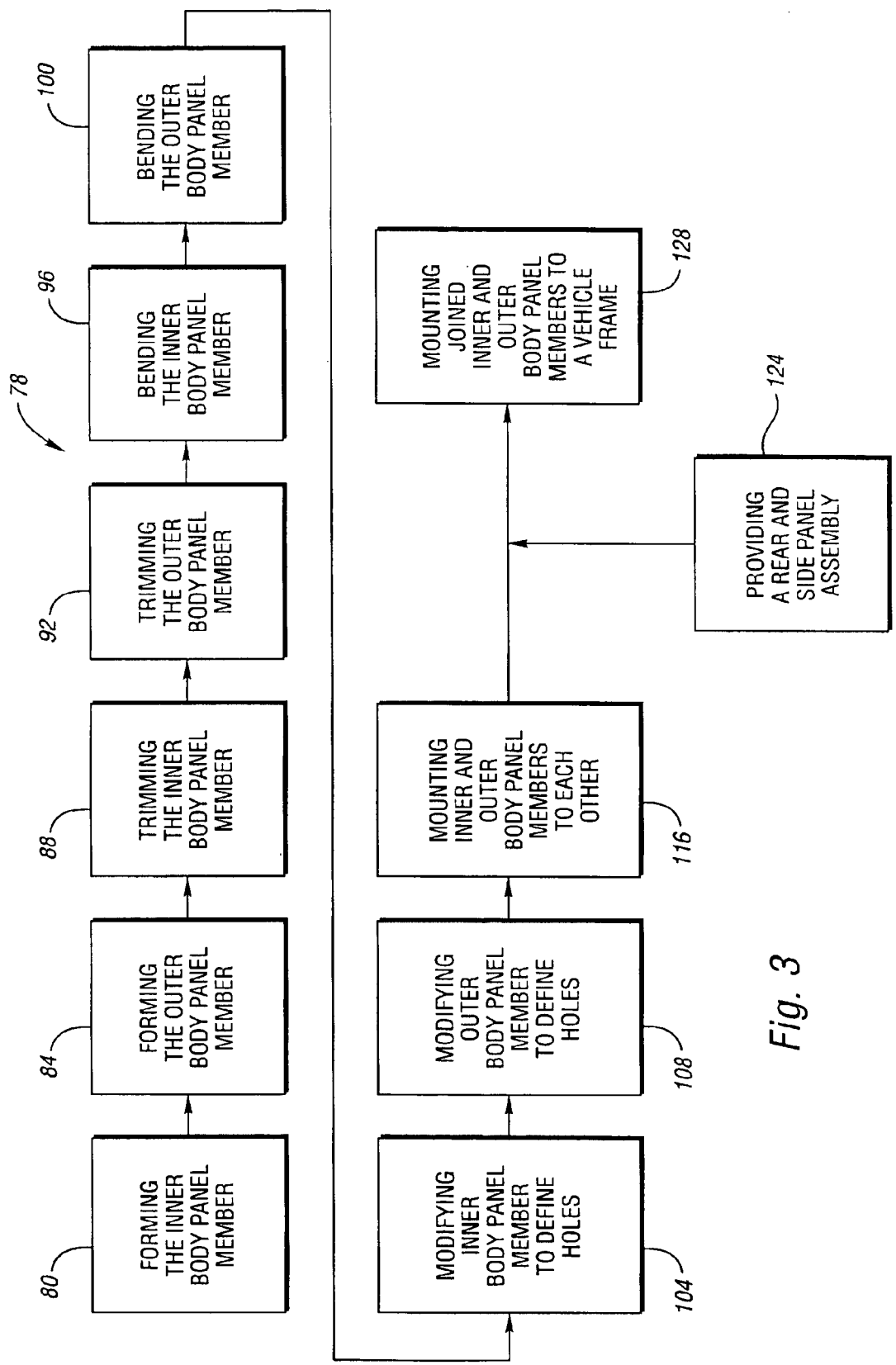
FIG. 3 is a flow diagram illustrating a method of assembling a vehicle that includes the rear and side panel assembly of FIG. 2a, in accordance with the invention.

FIG. 1a shows an inner body panel member 10. The inner body panel 10 may be one-piece or may be integral. As used herein, "integral" includes structurally joined and removably joined components. The inner body panel member 10 includes an inner rear panel portion 12. Inner rear panel portion 12 has an inner rear panel portion first end 14 and an inner rear panel portion second end 16. Inner body panel member 10 further includes a first inner side panel portion 18 extending from the inner rear panel portion first end 14 and a second inner side panel portion 20 extending from the inner rear panel portion second end 16. Furthermore, the inner body panel member 10 has an outer face 22 consisting of the exposed face of the inner body panel member 10 as viewed in FIG. 1a including the first and second inner quarter panel portions 18, 20 and the inner rear panel portion 12.

Inner body panel member 10 is characterized by structural formations 24 formed in inner body panel member 10 to provide structural rigidity to inner body panel member 10. The inner body panel member 10 further defines a trunk latch hole 28 configured to allow a trunk latch assembly to be mounted to the inner body panel member 10.

Additionally, inner body panel member 10 defines wiring holes 30 configured to allow wiring to pass through inner body panel member 10 or to be mounted thereto. Inner body panel member 10 also defines trim component hole 32 configured to allow mounting of a trim component, such as a trunk liner, to inner body panel member 10. The inner body panel member 10 may also define a hole designed to facilitate access for refueling a fuel tank located on the vehicle.

Referring to FIG. 1b, wherein like reference numbers refer to like components in FIG. 1a, an outer body panel member 34 is shown being mounted to the inner body panel member 10. The outer body panel member 34 may be one-piece or may be integral. The outer body panel member 34 is sufficiently contiguous and coextensive with the inner body panel member 10 to cover the outer face 22 of inner body panel member 10. As depicted in FIG. 1b, the outer body panel member 34 is matable with the inner body panel member 10. "Matable" means the outer body panel member 34 and the inner body panel member 10 are configured to fit together in a functional manner (i.e., such that they may function as an assembly serving as a vehicle rear body panel and vehicle side panels).

Outer body panel member 34 includes an outer rear panel portion 36. Outer rear panel portion 36 includes an outer rear panel portion first end 38 and an outer rear panel portion second end 40. Outer body panel member 34 includes a first outer side panel portion 42 extending from the outer rear panel portion first end 38 and a second outer side panel portion 44 extending from the outer rear panel portion second end 40. Outer body panel member 34 further defines an outer trunk latch hole 48 configured to allow a trunk latch assembly to be mounted to the outer body panel member 34, an outer wiring hole 50 configured to allow wiring to pass through or be mounted to outer body panel member 34 and an outer trim component hole 52 configured to allow a trim component to be mounted to the outer body panel member 34. The outer body panel member 34 may also define a hole designed to facilitate access for refueling a fuel tank located on the vehicle.

The inner rear panel portion 12 shown in FIG. 1a and the outer rear panel portion 36 shown in FIG. 1b are depicted as consisting mainly of the bumper portion of the rear of a vehicle. The invention contemplates that rear panel portions may also include a portion that extends substantially vertically between the bumper portion and the trunk lid, and further defines the trunk compartment.

As shown in FIG. 1b, the outer body panel member 34 may be mounted to the inner body panel member 10 at the outer face 22 of the inner body panel member 10 such that the inner body panel member 10 and the outer body panel member 34 are joined. Mounting may be accomplished by a process which may include welding, bonding, or hemming. Those skilled in the art will recognize a variety of ways for joining the inner and outer body panel members 10, 34.

The inner body panel member 10 and the outer body panel member 34 may each be formed from one rigid sheet. Preferably, the sheets would be aluminum. The inner body panel member 10 and the outer body panel member 34 may be formed by quick plastic forming, super plastic forming or hydroforming. Quick plastic forming is described in U.S. Pat. No. 6,253,588, issued Jul. 3, 2001 to Rashid, et al. and assigned to General Motors Corp., which is hereby incorporated by reference in its entirety. Superplastic forming is described in U.S. Pat. No. 5,974,847, issued Nov. 2, 1999 to Saunders, et al. and assigned to General Motors Corp., which is hereby incorporated by reference in its entirety. Hydroforming is also a feasible method of forming vehicle body panels.

Referring to FIG. 2a wherein like reference numbers refer to like components in FIGS. 1a–b, a rear and side panel assembly 56 is shown. The rear and side panel assembly 56 includes the inner body panel member 10 and the outer body panel member 34. The rear end side panel assembly 56 may be two-piece, integral or unitary. The first and second outer side panel portions 42, 44 extend generally forward from the outer rear panel portion 36. The rear and side panel assembly 56 is shown mounted to a vehicle frame 62 to partially form a vehicle body 64 on a vehicle 65. Both the vehicle frame 62 and the body 64 are shown with dashed lines. The vehicle frame 62 includes a left body lock pillar 66A and a right body lock pillar 66B to which the rear and side panel assembly 56 is joined. Mounting the rear and side panel assembly 56 to the body lock pillars 66A, 66B may be accomplished by spot or laser welding, fastening, adhesive bonding, or other methods sufficient to connect the rear and side panel assembly 56 to the frame 62 in a structurally secure manner. Preferably, such mounting would be accomplished by laser welding. Those skilled in the art will recognize a variety of methods for accomplishing such mounting.

Referring to FIG. 2b, wherein like reference numbers refer to like components in FIGS. 1a–2a, a cross section of the joined inner member 10 and outer member 34 mounted to the body lock pillar 66A is shown. The outer member 34 and the inner member 10 may each be formed with flanges 75A, 75B, respectively. The flanges 75A, 75B are not shown in FIG. 1a, 1b or 2a. The flanges 75A, 75B may be mounted to each other by welding, including spot welding and laser welding, adhesive bonding, hemming, or a combination of these methods. The outer member 34 and the inner member 10 may have additional flanges at other locations to accomplish mounting of the inner and outer members 10, 34 to each other.

Referring again to FIG. 2a, the first and second outer side panel portions 42, 44 and the first and second inner side panel portions 18, 20 on the joined inner and outer body panel members 10, 34 define edges 67A, 67B, respectively, that complement and further define wheel well openings 71A, 71B on the vehicle 65.

The vehicle body 64 includes a trunk lid 68 having a trunk latch 70. The trunk lid 68 and the rear and side panel assembly 56, including the inner body panel member 10 and the outer body panel member 34, are configured such that the trunk latch 70 is engageable with a trunk latch assembly (not shown) mountable at the inner trunk latch hole 28 and the outer trunk latch hole 48 shown in FIG. 1b when the trunk lid 68 is lowered to the rear and side panel assembly 56. The inner trunk latch hole 28 and the outer trunk latch hole 48 may be disposed such that they are aligned when the inner and outer body panel members 10, 34 are joined. Thus, the inner body panel member 10 and the outer body panel member 34 may be adapted for cooperation with the trunk lid 68. Furthermore, the inner body panel member 10 and the outer body panel member 34 partially define the rear and sides of a trunk compartment 69, the top of which is further defined by the trunk lid 68. In FIG. 2a, the trunk lid 68 is depicted as a traditional sedan trunk lid. The invention contemplates that the inner body panel member 10 and the outer body panel member 34 may be adapted for configuration with other types of trunk lids, such as a hatchback style lid, or other types of rear closures on utility vehicles.

Accordingly, as used herein, "trunk lid" includes a traditional sedan trunk lid, a hatch back style lid and other types of rear closures on utility vehicles.

FIG. 3 is a flow chart depicting a method 78 of assembling a vehicle that includes a rear and side panel assembly such as that shown in FIG. 2a. The method 78 includes forming 80 the inner body panel member 10. The method 78 may further include forming 84 the outer member 34. Forming 80 the inner body panel member and forming 84 the outer body panel member may be by quick plastic forming, super plastic forming or hydroforming.

The method 78 may further include trimming the inner body panel member 88 and trimming the outer body panel member 92. Trimming 88, 92 would remove excess sheet material to further define the desired shape of the inner body panel member 10 and of the outer body panel member 34.

The method 78 may further include bending the inner body panel member 96 such that the inner side portions 18, 20 extend generally frontward from the inner rear panel portion 22 as depicted in FIG. 1a. The method 78 may further include bending the outer body panel member 100 such that the first outer side panel portion 42 and the second outer side panel portion 44 extend generally frontward from the outer rear panel portion 36 as depicted in FIG. 1b. Bending may be accomplished by a press bend machine. Multiple bending cycles may be employed in order to obtain the desired shape. Those skilled in the art will recognize a variety of other techniques for bending the inner body panel member 10.

The method 78 may further include modifying the inner member to define holes 104 and modifying the outer member to define holes 108. Modifying to define holes 104, 108 may include laser cutting or mechanically cutting holes for trunk latches, wiring and trim components. Examples of the placement of and possible purposes for such holes are depicted in FIGS. 1a and 1b and discussed herein with respect thereto. A variety of techniques for cutting such holes will be recognized by those skilled in the art.

The method 78 may further include mounting 116 the inner body panel member to the outer body panel member such that the outer body panel member substantially covers the inner body panel member and the inner body panel member 10 and the outer body panel member 34 are joined as a rear and side panel assembly, as depicted in FIG. 2a. Mounting may be accomplished by hemming, welding or bonding, or by a combination of these techniques, within the scope of the method 78. Those skilled in the art will recognize a variety of other techniques for mounting the inner body panel member 10 and the outer body panel member 34.

The method 78 may further include providing 124 a rear and side panel assembly such as rear and side panel assembly 56 depicted in FIG. 2a (i.e., a pre-assembled rear and side panel assembly). The method 78 may further include mounting the joined inner and outer body panel members 128 (i.e., the rear and side panel assembly 56) to a vehicle frame to at least partially define a vehicle body, as depicted in FIG. 2a. Mounting 128 may be to body lock pillars, as depicted in FIG. 2a. Additionally, when so mounted, the inner and outer body panel members may at least partially define wheel well openings at opposing sides of the vehicle, as depicted in FIG. 2a. Mounting 128 may be accomplished by a variety of techniques including laser welding, fastening and bonding. Those skilled in the art will recognize a variety of techniques for mounting the rear and side panel assembly to the frame.

Once mounted to the frame, a trunk latch, wiring and trim components may be mounted to the assembly at the trunk latch, wiring and trim component holes, respectively, of the inner body panel member and the outer body panel member. Additionally, a decorative plastic facade may be mounted to the rear and side panel assembly, for instance, to cover the rear panel portion.

While the best mode for carrying out the invention has been described in detail, those familiar with the art to which this invention relates will recognize various alternative designs and embodiments for practicing the invention within the scope of the appended claims.

What is claimed is:

1. A rear and side panel assembly for a vehicle comprising a one-piece inner body panel member mated with a one-piece outer body panel member, said body panel members cooperating such that each of said body panel members at least partially defines wheel well openings on rear opposing sides of the vehicle.

2. The rear and side panel assembly of claim 1, wherein the inner body panel member is formed from a first rigid sheet and the outer body panel member is formed from a second rigid sheet.

3. The rear and side panel assembly of claim 2, wherein said first and second sheets are aluminum.

4. The rear and side panel assembly of claim 1, wherein the inner body panel member and the outer body panel member are adapted for cooperation with a trunk lid.

5. The rear and side panel assembly of claim 1, wherein the inner body panel member and the outer body panel member define holes for at least one of trunk latches, wiring and trim components.

6. The rear and side panel assembly of claim 1, wherein the inner body panel member is characterized by formations configured to provide structural rigidity.

7. The rear and side panel assembly of claim 1, wherein at least one of the inner body panel member and outer body panel member is formed by quick plastic forming.

8. The rear and side panel assembly of claim 1, wherein at least one of the inner body panel member and the outer body panel member is formed by super plastic forming.

9. The rear and side panel assembly of claim 1, wherein at least one of the inner body panel member and the outer body panel member is formed by sheet hydroforming.

10. The rear and side panel assembly of claim 1, wherein the inner body panel member and the outer body panel member are joined at least partially by hemming.

11. The rear and side panel assembly of claim 1, wherein the inner body panel member and the outer body panel member are joined at least partially by welding.

12. The rear and side panel assembly of claim 1, wherein the inner body panel member and the outer body panel member are joined at least partially by bonding.

13. The rear and side panel assembly of claim 1, wherein the inner body panel member and the outer body panel member are aluminum.

14. The rear and side panel assembly of claim 1, wherein the inner body panel member has an outer face and the inner body panel member and the outer body panel member are sufficiently contiguous and coextensive with each other such that the outer body panel member substantially covers the outer face of the inner body panel member.

15. The rear and side panel assembly of claim 1, wherein said inner body panel member includes an inner rear panel portion having opposite ends, a first inner side panel portion at one end and a second inner side panel portion at the opposed end, wherein the said inner side panel portions extend generally frontward from the inner rear panel portion;

wherein said outer body panel member includes an outer rear panel portion having opposite ends, a first outer side panel portion at one end and a second outer side panel portion at the opposed end, wherein the outer side panel portions extend generally frontward from the outer rear panel portion; and wherein the inner and the outer body panel members are joined as an assembly.

16. The rear and side panel assembly of claim 15, wherein each of the side panel portions on the joined inner and outer body panel members define an edge that is configured to complement and further define a wheel well opening on a vehicle, and wherein each of the side panel portions is configured to extend frontward such that it is mountable to a body lock pillar on the vehicle.

17. The rear and side panel assembly of claim 15, wherein each of the inner body panel member and the outer body panel member is integral.

18. A rear and side panel assembly for a vehicle body comprising:

an integral one piece inner body panel member including an inner rear panel portion having opposite ends, a first inner side panel portion at one end and a second inner side panel portion at the opposed end, wherein said inner side panel portions extend generally frontward from the inner rear panel portion; and an integral one piece outer body panel member matable with the inner body panel member including an outer rear panel portion having opposite ends, a first outer side panel portion at one end and a second outer side panel portion at the opposed end, wherein said outer side panel portions extend generally frontward from the outer rear panel portion;

wherein the inner and the outer body panel members are joined as an assembly.

* * * * *